United States Patent [19]

Fujio

[11] 4,293,364

[45] Oct. 6, 1981

[54] METHOD AND MACHINE FOR OPENING UP A CYLINDRICAL FILM TUBE AND FITTING IT OVER AN OBJECT

[75] Inventor: Masaaki Fujio, Suita, Japan

[73] Assignee: Fuji Seal Industry Co., Ltd., Osaka, Japan

[21] Appl. No.: 72,106

[22] Filed: Sep. 4, 1979

[30] Foreign Application Priority Data

Sep. 14, 1978 [JP] Japan ............................... 53-113473

[51] Int. Cl.$^{3}$ ............................................... B32B 31/02

[52] U.S. Cl. ...................................... 156/344; 53/289; 53/292; 156/86; 156/293; 156/584

[58] Field of Search ................. 156/86, 344, 584, 294, 156/293; 53/289, 291, 292, 296, 427, 433, 441; 29/235, 446, 447

[56] References Cited

U.S. PATENT DOCUMENTS

| | | | |
|---|---|---|---|
| 4,016,704 | 4/1977 | Fujio | 156/86 |
| 4,144,631 | 3/1979 | Fujio | 156/86 |
| 4,184,309 | 1/1980 | Amberg | 53/292 |

*Primary Examiner*—Caleb Weston
*Attorney, Agent, or Firm*—Michael A. Painter

[57] ABSTRACT

A cylindrical film tube is to be fitted over an object. Initially the tube is in a flattened state with its opposite sides touching one another. First two vacuum suckers are contacted to the collapsed tube, one on each of its sides, so as to oppose one another. Vacuum is supplied to these suckers so that they suck and grip the tube. Then they are moved relative to one another in a direction parallel to the surfaces of the tube which they are gripping, so as to shear these surfaces relative to one another and break their contact with one another, in case they are adhering together. Then the suckers are moved apart from one another in the direction perpendicular to the film surfaces which they grip, so as to open up the tube. Lastly, the opened-up tube is fitted over the object. In a preferred embodiment, the shear direction is perpendicular to the generators of the flattened tube. A machine is also disclosed for performing this process repeatedly.

5 Claims, 6 Drawing Figures

METHOD AND MACHINE FOR OPENING UP A CYLINDRICAL FILM TUBE AND FITTING IT OVER AN OBJECT

BACKGROUND OF THE INVENTION

The present invention relates to a method and an apparatus for putting a cylindrical film tube over an object such as a container or the like, and more particularly relates to such a method and apparatus in which the film tube is supplied in a collapsed form, with its two sides touching one another, so as to be like a flat sheet.

In the process of putting a film cylinder over an object, very often the film cylinder is cut from a roll of material by a cutter. In this case, the film cylinder is supplied in a collapsed form, with its two sides touching one another, like a flat sheet or piece of ribbon. The problem has therefore arisen, in this process, of opening out the collapsed cylinder. Especially when the wrapping of the object is to be performed quickly, and a large number of objects must be wrapped sequentially at high speed, this problem can be quite difficult. The matter is further complicated by the fact that the two sides of the collapsed tube may rather tend to stick to one another, especially if the material is soft and flexible, such as plastic or polyethylene tube, or is electrified somewhat, or has been stored on a roll for a long time before use. This sticking together of the two sides of the tube must be broken in some reliable and efficient way.

SUMMARY OF THE INVENTION

Therefore, it is an object of the present invention to provide a method and an apparatus for opening such a collapsed film tube and putting it over an object, which is reliable, fast, and efficient.

According to the present invention, this and other objects are accomplished by a method for putting a cylindrical film tube over an object, the tube being initially in a collapsed state with its opposite sides flattened together so as to be in contact, comprising the steps in the specified order of: (a) contacting two vacuum suckers to the collapsed tube, one on each of its sides, so as to oppose one another, and supplying vacuum to these suckers so that they suck and grip the tube; (b) moving these suckers relative to one another in a direction which is parallel to the surfaces of the tube which they are gripping, and breaking the contact of the two sides of the collapsed tube by so doing; (c) moving these suckers apart from one another in the direction perpendicular to the surfaces of the tube which they are gripping, and opening up the tube by so doing; and (d) putting the opened-up tube over the object.

Further, this and other objects are accomplished by an apparatus for putting a cylindrical film tube over an object, comprising two vacuum suckers which oppose one another, means for supplying the tube to a position between the suckers while said tube is in a collapsed state with its opposite sides flattened together so as to be in contact, means for supplying vacuum to the suckers, means for moving the suckers relative to one another along a line parallel to the line joining them, and means for moving the suckers relative to one another along a second line perpendicular to the line joining them.

BRIEF DESCRIPTION OF THE DRAWINGS

The present invention will become more fully understood from the following description of a preferred embodiment thereof, and from the accompanying drawings. It should be clearly understood, however, that the drawings and the description of the embodiment are not intended to limit the scope of the present invention, or of the protection sought to be granted by Letters Patent, in any way; these are to be defined solely by the accompanying claims. In the drawings:

DESCRIPTION OF THE PREFERRED EMBODIMENT

Figure 1:
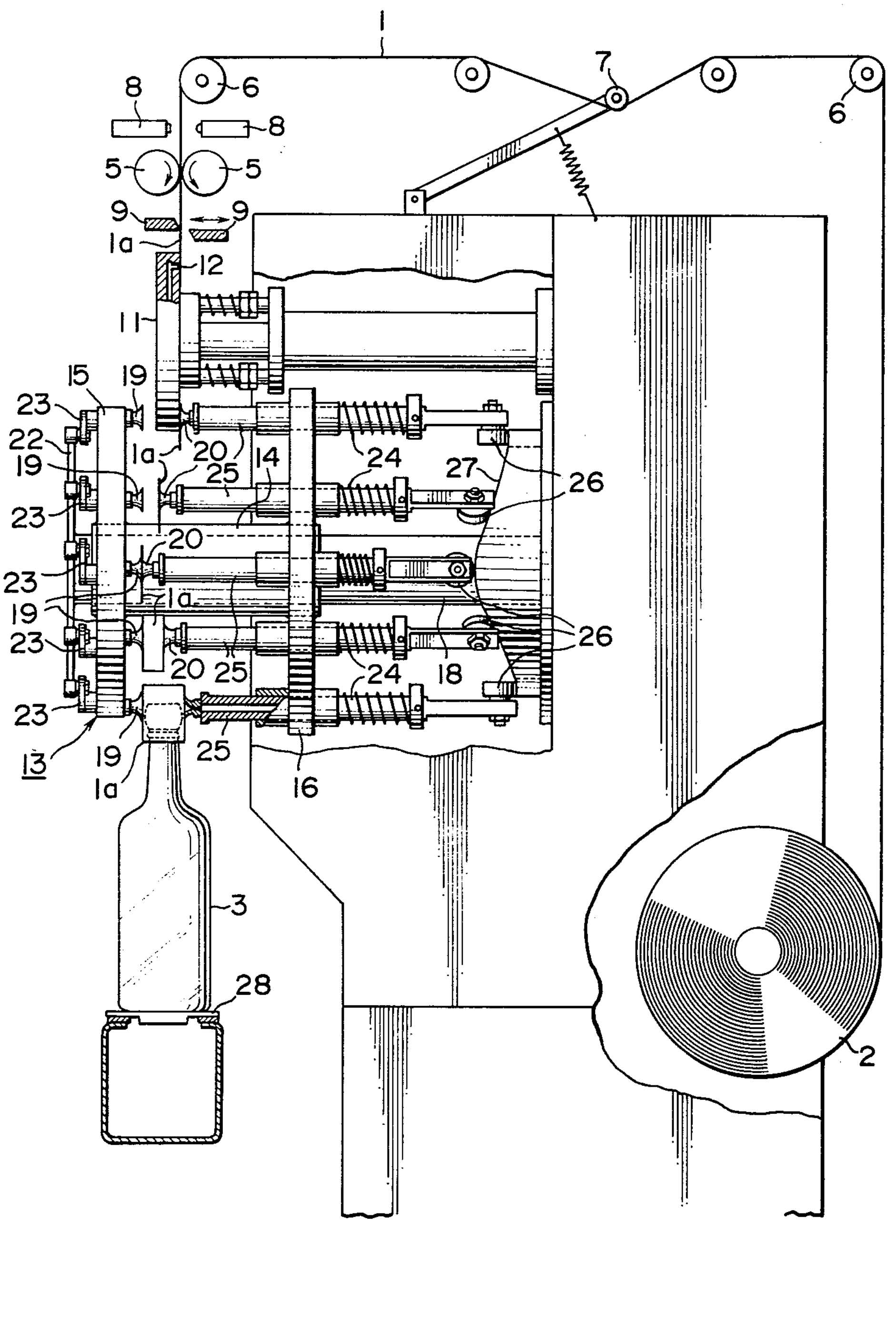
FIG. 1 is a view from the right hand side of an apparatus according to the present invention which cuts off lengths of film tube and fits them over bottles.
Figure 2:
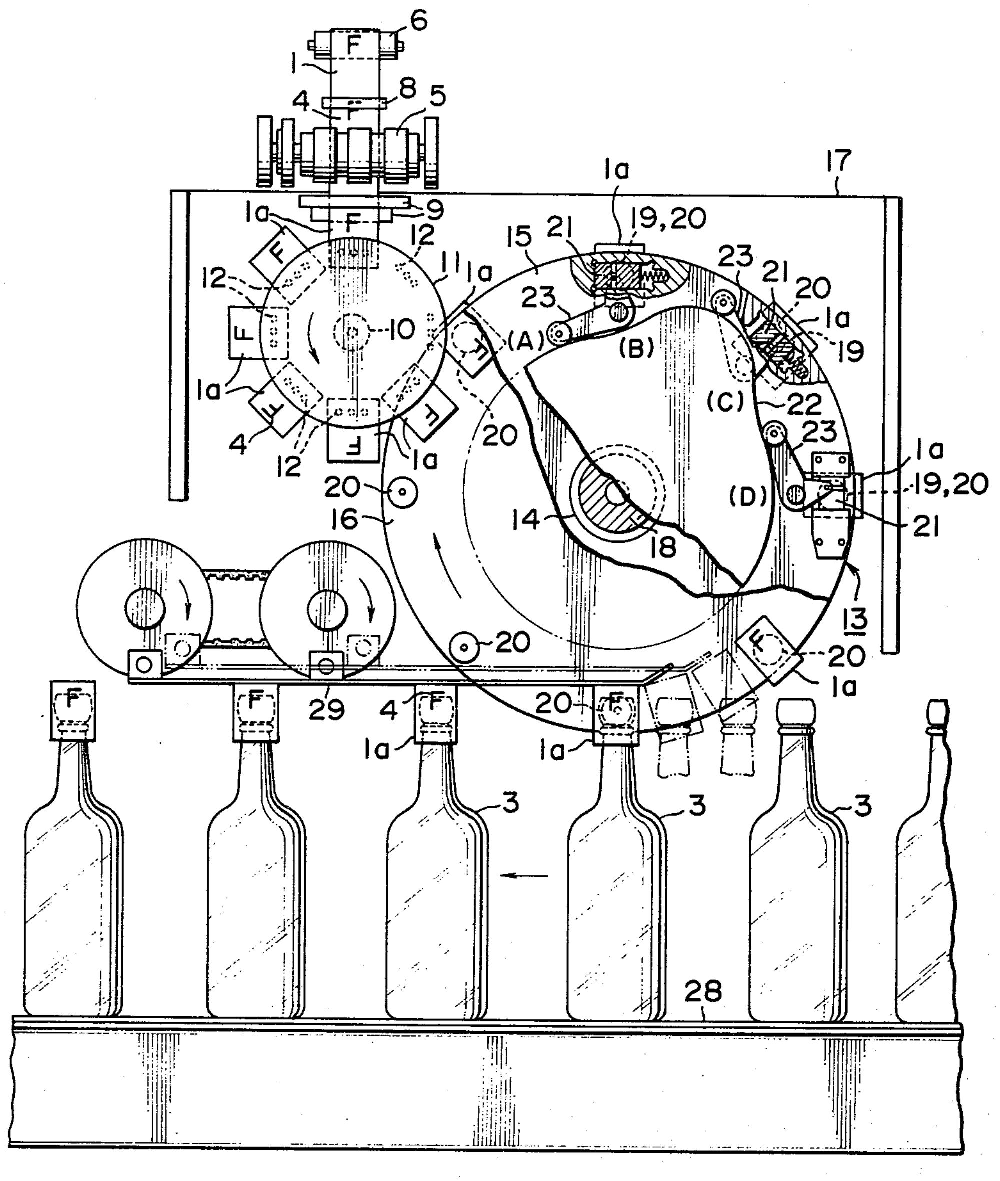
FIG. 2 is a front view of the same apparatus.

Referring to FIGS. 1 and 2, there is therein shown a machine which practices the process of the present invention. A long soft tube 1, which in this embodiment is a tube of heat-shrinkable plastic material, is flattened into a ribbon form and wound on a reel 2. From this reel 2 it is led, via guide rollers 6 and a tension roller 7, to a photoelectric detector 8. The film tube 1 is printed repetitively, in this embodiment, with a pattern such as a label or the like, and this is detected by the detector 8, which controls the cutters 9 so as to cut off a piece of the tube 1 of the appropriate length and printing for sealing the bottle 3 which is fed on the conveyor 28. This piece of film tube hereinafter is designated by the reference numeral 1*a*, and is at this stage in the form of a collapsed cylinder, with its two sides touching one another, and, in view of the nature of the material thereof, probably adhering to one another strongly.

As best seen in FIG. 2, the apparatus shown is adapted to perform the sealing operation repeatedly and sequentially on many bottles 3, and for this purpose two revolving mounts or turrets 11 and 13 are provided to rotate in opposite directions about horizontally parallel axes, as shown in the figure by the arrows. The feed turret 11, which is mounted about the axis 10, sequentially picks up the cut film pieces 1*a* from below the cutters 9 and carries them round, held against the vacuum holes 12 in its circumference, with their ends "F" projecting somewhat. When each piece of film is brought to a position wherein its end "F" opposes the circumference of the main turret 13, supply of vacuum to the hole 12 holding this film piece is interrupted, and it is picked up by a suction disk 20 to be hereinafter described, mounted on the main turret 13. The supply of vacuum to the holes 12 of the feed turret 11 is controlled by a suitable valve mechanism of a per se well known sort, not shown in the drawings.

The main turret 13 is mounted to be rotatable around a horizontal axis on a shaft 14, which is hollow, and is slidably fitted over a fixed shaft 18, which is attached to the main frame of the apparatus which is not shown in the drawings. The turret 13 comprises a front plate 15 and a rear plate 16. On the back of the front plate 15 are mounted a plurality of vacuum suckers 19, and on the front of the back plate 16 are mounted the same number of vacuum suckers 20, each as opposing one of the suckers 19. Each of these suckers 20 picks up, as explained heretofore, a piece of collapsed film tube 1*a* from the feed turret 11, as it passes the load station where the feed turret 11 and the main turret 13 are closest together.

According particularly to the present invention, the vacuum suckers 19 are movable sideways, perpendicularly to the line joining the suckers 19 and 20, and, in this embodiment, also perpendicularly to the generators of the collapsed cylinder of film which is being held by the suckers; and, further, the vacuum suckers 20 are movable parallel to the line joining them to the suckers 19, so as to be brought towards and away from these suckers 19.

In more detail, the suckers 19 are each mounted on a slider 21 which slides in a direction perpendicular to the radius of the main turret 13 in a slot, not designated by any reference number, and is biased in one direction by a spring which is also not designated by any reference number. This motion is controlled by a cam lever 23, pivoted to the turret, the other end of which rides on a cam 22 which is fixed to the end of the fixed shaft 18, and which therefore does not rotate with the turret 13, but is fixed.

Further, each sucker 20 is mounted on the front end of a rod 25 which slides in the rear plate 16, and the other end of which is fitted with a roller 26 which rides on a cylindrical cam 27, which, again, is fixed. Each rod 25 is biased in the backwards direction by a spring 24.

The profiles and positions of the cams 22 and 27 are arranged such that the sideways motion of the suckers 19, and the longitudinal motion of the suckers 20, are synchronized properly for the correct functions of the device, as explained later, to be performed. These terms "sideways" and "longitudinal" are used with reference to the line joining the suckers 19 and 20, and can equally well be understood as referring to the orientation of the surface of the piece of film held by the suckers. That is, the motion of the suckers 20 is perpendicular to this surface, while the motion of the suckers 19 is a shear motion along the surface, and in this embodiment (although this is not essential to the present invention) is perpendicular to the generators of the collapsed cylinder.

Figure 3A:
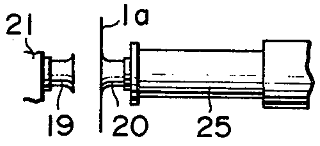
FIGS. 3A–3D are schematic sets of figures, showing how a film tube is opened up by the mechanism of the apparatus of FIGS. 1 and 2.
Figure 3B:
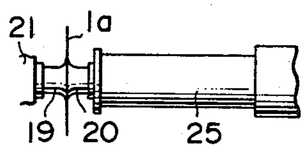
Figure 3C:
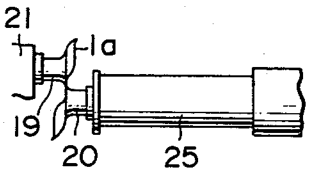
Figure 3D:
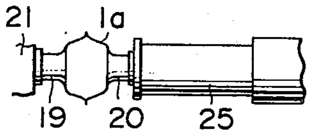

In the operation of this machine, first, as explained above, a piece of film tube in collapsed form is supplied to one of the suckers 20 and held thereto by supply of vacuum thereto provided by a vacuum supply and valving means which is not shown in the drawings, and is of a per se well known sort. This condition is illustrated in FIG. 3A, wherein the generators of the collapsed film cylinder are perpendicular to the paper of the drawing. This supply of the film tube is performed while the rod 25 and sucker 20 are in their rearwards position. Then, by the action of the cam 27, as the main turret 13 rotates, the sucker 20 and rod 25 are moved forwards, so that the film tube is held in contact with both of the suckers 19 and 20, as shown in FIG. 3B. At this time supply of vacuum to the sucker 19 is started. Thus the film tube is being sucked between both of the suckers 19 and 20. Then, by the action of the cam 22, the sucker 19 is moved sideways, as shown in FIG. 3C. In the present embodiment, this motion is perpendicular to the generators of the collapsed tube. By this relative motion of the suckers 19 and 20, any adhesion between the two contacting sides of the collapsed film tube is effectively broken by a shearing action, and the fact that this shearing motion is perpendicular to the generators of the cylinder ensures that no undesirable crumpling of the film tube will occur. Finally, as shown in FIG. 3D, by the action of the cam 27 the rod 25 and the sucker 20 are moved backwards, and simultaneously the previous motion of the sucker 19 is cancelled. Thereby the film tube is opened up.

By this time the tube has advanced to the lowermost position on the main turret 13, and, as shown in FIG. 1, has fitted over the neck of a bottle 3 which is being supplied by the conveyor 28. It is then further pressed onto the neck of the bottle by the press plate 29 which is moved with the appropriate timing. Then another bottle comes along the conveyer and receives the next piece of film from the turret; and so on repeatedly.

Thus it is seen that, by the present invention, the film tube may be opened up reliably and positively, and there is no risk of its sides sticking together so that it cannot be properly fitted over the object (such as a bottle container, in the shown embodiment). According to the present invention, therefore, a method and an apparatus are provided which are quick, convenient, and easily adapted to mass production, and which are reliable.

Although the present invention has been shown and described with reference to a preferred embodiment, it should not be considered as limited to this, however, or mere and simple generalizations, or other detailed embodiments; yet further alterations, omissions, and changes to the form and the content of any particular embodiment could be made, without departing from the spirit or the scope of the present invention, which is to be delimited solely by the following claims.

I claim:

1. A method for putting a cylindrical film tube over an object, the tube being initially in a collapsed state with its opposite sides flattened together so as to be in contact, comprising the steps in the specified order of:

(a) contacting two vacuum suckers to the collapsed tube, one on each of its sides, in axial opposition to one another, and supplying vacuum to these suckers so that they suck and grip the tube;

(b) moving the suckers relative to one another in a direction which is parallel to the surfaces of the tube which they are gripping and perpendicular to the axis of said suckers, and breaking the contact of the two sides of the collapsed tube by so doing;

(c) moving these suckers apart from one another in the direction perpendicular to the surfaces of the tube which they are gripping, and opening up the tube by so doing; and (d) putting the opened-up tube over the object.

2. A method as in claim 1, wherein the direction of motion of the suckers relative to one another in step (b) is also perpendicular to the generators of the collapsed cylindrical tube.

3. An apparatus for putting a cylindrical film tube over an object, comprising two vacuum suckers which are in axial opposition to one another, means for supplying the tube to a position between the suckers while said tube is in a collapsed state with its opposite sides flattened together so as to be in contact, means for supplying vacuum to the suckers, means for moving the suckers relative to one another along a line parallel to the axis of said suckers, and means for moving the suckers relative to one another along a second line perpendicular to the axis of said suckers.

4. An apparatus as in claim 3, wherein the tube supplying means is adapted to supply the tube in a certain preferred orientation, and wherein the second line is perpendicular to the generators of the collapsed cylindrical tube when it is supplied in said preferred orientation.

5. An apparatus for sequentially putting a plurality of cylindrical film tubes over a plurality of objects which are sequentially supplied, comprising a revolving mount, a plurality of pairs of first and second vacuum suckers initially being disposed in axial opposition to one another, said pairs of first and second vacuum suckers mounted around the mount so as to rotate therewith, the first and second suckers of each pair opposing one another, a first cam and follower mechanism which, when each pair of suckers reaches a certain predetermined position, moves them relative to one another in a direction perpendicular to the axis of said suckers, and a second cam and follower mechanism which, when each pair of suckers reaches another certain predetermined position, moves the relative to one another in a direction parallel to the initial axis of said suckers.

* * * * *